United States Patent [11] 3,556,470

[72] Inventors Henry Ehrens
 Bayside, N.Y.;
 Sidney Weiner, Cresskill, N.J.
[21] Appl. No. 678,251
[22] Filed Oct. 26, 1967
[45] Patented Jan. 19, 1971
[73] Assignee Sealed Unit Parts Co., Inc.
 Allenwood, N.J.
 a corporation of New York

[54] FLARE-OPERATED VALVE
 3 Claims, 8 Drawing Figs.
[52] U.S. Cl. .................................................. 251/149.4,
 137/74
[51] Int. Cl. .................................................. F16l 29/00
[50] Field of Search ........................................ 251/149.4,
 149—149.8, 337; 137/74,
 614.02—614.05(Cursory); 267/(Inquired)

[56] References Cited
 UNITED STATES PATENTS
1,289,714  12/1918  Elkin ............................. 251/149.6
928,797   7/1909   Rohrbacher ................... 251/149.4X
1,211,173  1/1917   King .............................. 137/74X
2,337,096  12/1943  Geiger ........................... 251/149.4
2,842,381  7/1958   Franck ........................... 251/149.4
3,308,847  3/1967   Umann ........................... 137/613

FOREIGN PATENTS
893,785   4/1962   Great Britain ................ 251/149.4
134,037   10/1919  Great Britain ................ 251/149.4

Primary Examiner—M. Cary Nelson
Assistant Examiner—Richard Gerard
Attorney—Yuter and Spiecens ABSTRACT: A flare-operated valve having a through bore comprising an enlarged diameter first portion and a reduced diameter second portion interconnected by a connecting wall. A valve member is slidably received in the bore and includes means for sealingly engaging the connecting wall to prevent the flow of a fluid through said bore. A flare nut is adapted to unseat the valve member to allow passage of the fluid thereby to provide a simple and economic valve.

PATENTED JAN 19 1971
3,556,470
SHEET 1 OF 2
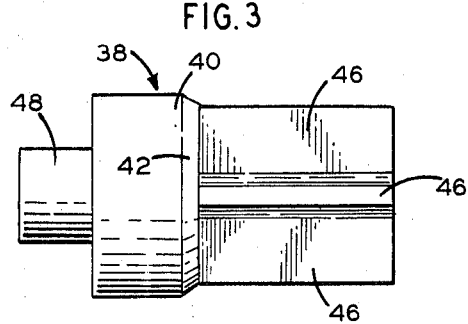
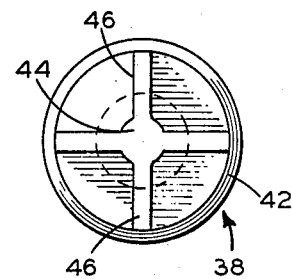
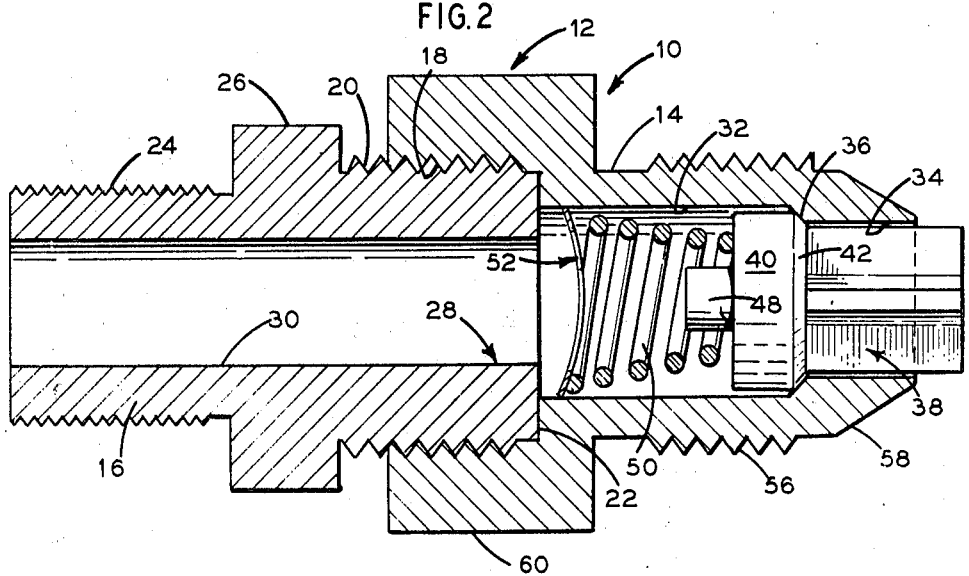
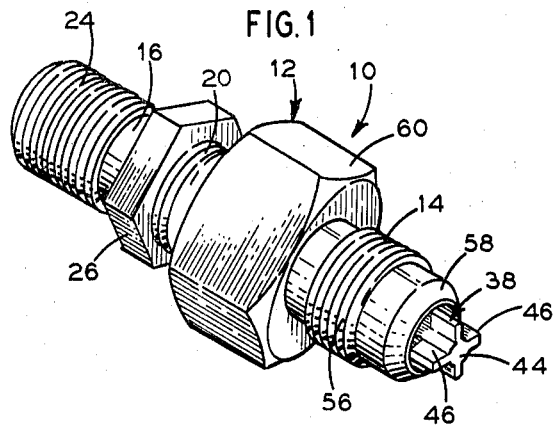
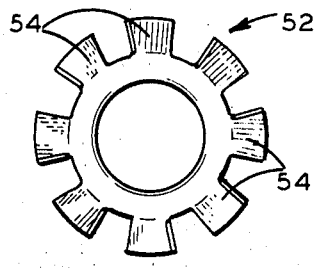
INVENTORS
Henry Ehrens
Sidney Weiner
BY Yuter & Spiecens
ATTORNEYS

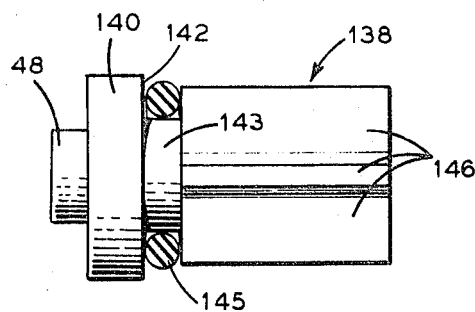
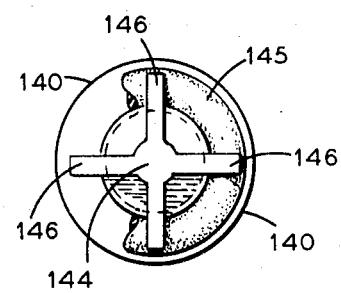
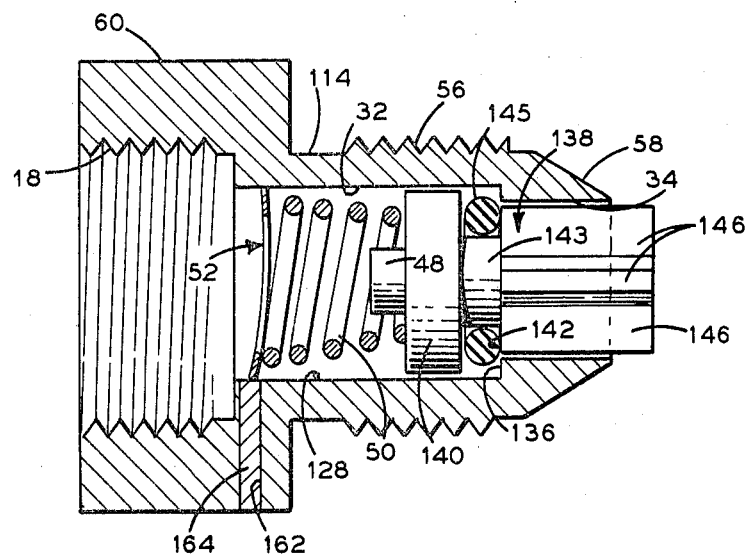

FLARE-OPERATED VALVE

This invention relates generally to a valve construction and more particularly, pertains to improvements in a flare operated valve.

An object of this invention is to provide a valve which is operable at high temperatures.

Another object of the invention is to provide a valve having a removable valve-member-retaining section so that the valve may be welded in place without damaging the valve member.

A further object and feature of the present invention resides in the novel details of construction which provide a valve of the type described in which a fluid flows freely through the valve at a relatively fast rate when it is in the open position.

Another object of the invention is to provide a flare-operated valve construction having a long, trouble-free life.

A further object of this invention is to provide a valve for controlling the flow of a fluid which is highly reliable in operation and extremely economical to manufacture.

Another object of the present invention is to provide a valve of the type described which is easy to install and service.

Accordingly, a valve constructed in accordance with the present invention includes a valve body having a through bore comprising a first portion, a second portion having a different diameter than the first portion and a connecting wall interconnecting the first and second portions. A valve member is movable in the bore between a valve-closed position wherein the valve member sealingly engages the connecting wall and a valve-open position wherein the valve member is spaced from the connecting wall to control the flow of a fluid through the valve. Biasing means is provided to bias the valve member to the valve-closed position to provide a normally closed valve.

A feature of the present invention is to provide a valve which has a minimum of moving parts and which is reliable in operation.

Other features and advantages of the present invention will become more apparent from a consideration of the following detailed description when taken in conjunction with the accompanying drawings, in which:

FIG. 1 is a perspective view of a flare-operated valve constructed according to the present invention, to a reduced scale;

FIG. 2 is a vertical sectional view thereof, showing the valve in the valve-closed position;

FIG. 3 is a front elevational view of the valve member;

FIG. 4 is an end elevation of the valve member of FIG. 3;

FIG. 5 is a plan view of the spring-retaining washer;

FIG. 6 is a vertical sectional view of a modified embodiment of a valve section of a valve;

FIG. 7 is a front elevational view of the valve member utilized in the construction shown in FIG. 6; and FIG. 8 is an end elevation thereof.

The valve of the present invention is designated generally by the reference numeral 10 in FIGS. 1 and 2, and includes a valve body 12 fabricated from a suitable metal. The body 12 includes a first or valve section 14 and a second section or connecting member 16. The rear portion of the section 14 is internally threaded at 18 and is adapted to threadedly engage the forward externally threaded portion 20 of the section 16. The front edge of the section 16 abuts a shoulder 22 in the section 14 to provide a seal therebetween. Accordingly the sections 14 and 16 easily may be separated simply by unscrewing the same.

The second section or connecting member 16 further includes a reduced diameter threaded portion 24 and a radially extending flange 26 which is provided with flat facets so that it may be gripped easily by a wrench or a similar tool. The portion 24 is adapted to be threadedly engaged in the wall of a tank (not shown) or the like so that the lower portion of the valve body 12 extends into the tank and the flange 26 sealingly engages the wall of the tank. A suitable gasket may be provided between the flange 26 and the wall of the tank or the flange may be welded to the tank wall to insure a seal therebetween. In this matter, the valve 10 provides a selectively operable device which regulates the flow of a fluid either into or out of the tank.

A central through bore, designated generally by the reference numeral 28, is provided in the valve body 12. The bore 28 comprises a bore 30 of substantially uniform diameter in the section 16, and an enlarged diameter portion 32 and a forward reduced diameter portion 34 in the section 14 of the valve body 12. The portions 32 and 34 of the bore 28 are interconnecting by a connecting portion or wall 36 which tapers inwardly and forwardly from the portion 32 to the portion 34. The bore 28 provides a passage for the flow of a fluid through the valve 10.

Slidingly received in the through bore 28 for reciprocating movement between a valve-open and a valve-closed position is a valve member which is designated generally by the reference numeral 38. The valve member 38 includes a circular portion 40 which is received in the enlarged diameter portion 32 of the bore 28. The diameter of the portion 40 is smaller than the diameter of the bore portion 32 so that a fluid may flow easily around this portion of the valve member and through the passage defined by valve member portion 40 and bore portion 32, as noted in detail below.

The front surface of the portion 40 of the valve member 38 tapers inwardly and forwardly at 42 complementary to the tapering connecting wall 36. The surface 42 is adapted to sealingly engage the connecting wall 36 when the valve member 38 is in the valve-closed position to prevent the flow of a fluid through the bore 28. To put this another way, the connecting wall 36 of the bore 28 and the surface 42 of the valve member 38 are provided with complementary tapers. Hence, when the surface 42 engages or seats on the wall 36 the passage between the bore portions 34 and 32 is effectively blocked or sealed thereby preventing the flow of a fluid through the valve.

However, when the surface 42 is unseated from the wall 36 when the valve member 38 is moved rearwardly to the valve-open position, the fluid is free to flow through the bore portion 34, and around the valve member portion 40 to exit from the bore portion 30.

Extending forwardly from the front surface of the portion 40 of the valve member 38, beyond the front edge of the valve body section 14, is a central core 44 having spaced radially extending arms or fins 46. The arms 46 slidingly engage the walls of the bore portion 34 to centrally locate the valve member portion 40 in the bore portion 32. The arms 46 and the core 44 extend a sufficient distance beyond the valve body 10 so that they may be engaged by a flare nut to effect movement of the valve member 38 to the valve-open position.

In practice, the valve member 38 may be fabricated from nylon or delryn or a substance having similar properties such as Teflon. Alternatively, the valve member may be made of metal.

Biasing means is provided to bias the valve member 38 to the valve-closed position. To be more specific, the valve member 38 is provided with a rearwardly extending centrally located boss 48. Received within the bore portion 32 is a conical spring 50. The small end of the conical spring 50 receives the boss 48 therethrough and the end of the spring abuts the rear surface of the valve member, as shown in FIG. 2. The boss 48 centrally locates the spring on the valve member. The other or larger end of the spring 50 abuts a retaining washer 52 which is similarly received in the bore portion 32. Accordingly, the spring 50 biases the valve member 39 into sealing engagement with the wall 36, as noted above, to prevent fluid flow through the valve so that the valve is normally closed.

The retaining washer 52 is shown in FIG. 5. The washer is provided with a plurality of circumferentially spaced teeth 54. The diameter of the washer 52 (i.e., the distance from one tooth edge to the edge of a diametrically opposed tooth) is slightly greater than the diameter of the bore portion 32. Moreover, the washer 52 is fabricated from a flexible metal. Accordingly, when the washer 52 is inserted into the bore portion 32, the washer flexes so that the central part extends forwardly, as sown in FIG. 5. Moreover, the spring 50 exerts a rearwardly directed force on the washer which causes the edges of the teeth 54 to dig into the walls defining the bore portion 32 so that the washer will remain in place even though the sections 14 and 16 are separated.

Additionally, the washer 52 greatly facilitates assembling the valve 10. Thus, all the manufacturer is required to do is to drop the valve member 38 in place through a bore portion 32, insert the spring 50 and then push the washer 52 into position against the bias of the spring. The washer automatically locks into position, as noted above.

The section 14 of the valve is provided with external threads at 56 which are adapted to threadedly engage with a conventional flare nut. The front edge 58 of the section 14 is beveled to facilitate placement of the flare nut on the valve 10. Additionally, the section 14 is provided with a radially extending flange 60 beyond the threads 56. The flange 60 is provided with a plurality of flat facets so that it can be gripped easily by a tool, such as a wrench.

In operation, the sections 14 and 16 of the valve 10 are separated and the threaded portion 24 of the section 16 is screwed into the wall of an appropriate container. It is to be noted that the section 16 may be welded in place since the section 14, which contains the operable elements, is not connected thereto. Thereafter, the section 14 is screwed on to the threaded portion 20 of the section 16 until the shoulder 22 abuts the edge of the section 16 to provide a seal therebetween.

Since the spring 50 biases the surface 42 of the valve member 38 into sealing engagement with the connecting wall 36, the valve will normally remain in the valve closed position. However, when it is desired to introduce a fluid into the tank, a flare nut is screwed onto the threaded portion 56. As is conventional, the flare nut engages the edges of the core 44 and arms or fins 46 and moves the valve member 38 rearwardly as the nut is threaded into place. This action unseats the surface 42 from the wall 36 to provide a passage for the flow of the fluid through the bore portion 34, around the valve member portion 40 and the passage defined by this portion of the valve member and the bore portion 32, and through the bore portion 30 into the tank. The spaces between adjacent arms 46 provide for the unobstructed flow of the fluid through the bore portion 34. It should be noted that when it is desired to remove the fluid from the tank the same procedure is followed except the fluid flows in the reverse direction.

When the filling (or emptying) operation has been completed, the flare nut is removed and the spring 50 biases the valve member 38 back to the valve-closed position.

If the valve malfunctions, the section 14 may be replaced easily thereby eliminating the necessity to unweld or otherwise remove the connecting section 16.

Accordingly, a flare-operated valve has been described which is simple in construction and reliable in operation.

A modified embodiment of a valve constructed according to the present invention is shown in FIGS. 6—8 in which like numerals in FIGS. 1—5 and 6—8 indicate identical elements. It should be noted that the valve section 114 only is shown in FIG. 6, it being understood that the connecting member 16 is adapted to be threadedly engaged with the section 114 via the internally threaded portion 18.

Similarly to the valve section 14, the valve section 114 includes a central through bore 128 including an enlarged diameter portion 32 and a reduced diameter forward portion 34. An annular shoulder or connecting wall 136 is defined between the portions 32 and 34.

Slidingly received in the through bore 128 for reciprocating movement between a valve-open and a valve-closed position is a valve member 138. Similarly to the valve member 38 shown in FIGS. 3 and 4, the valve member 138 includes a circular portion 140 which is received in the enlarged diameter portion 32 of the bore 128. The diameter of the portion 140 is smaller than the diameter of the bore portion 32 so that a fluid may flow easily around this portion of the valve member. The valve member 138 is also provided with a core 144 and spaced radially extending arms or fins 146 similarly to the member 38. That is, the arms 146 are smaller than the radius of the portion 140 and they slidingly engage the walls of the bore portion 34 to centrally position the valve member in the bore 128.

An annular groove 142 is provided in the circular portion 140 adjacent the fins 146 to define a boss 143. The arms or fins 146 extend beyond the edge of the boss 143 as shown in FIG. 8. Received in the groove 142 is an O-ring 145 which is fabricated from a flexible and resilient material such as rubber or the like. The O-ring 145 is sized and positioned to engage the shoulder or connecting wall 136 to prevent communication between the bore portions 32 and 34. In other words, the spring 50 biases the valve member 138 forwardly. Thus, the circular portion 40 compresses the resilient O-ring 145 against the wall 136 thereby sealing the passage between the bore portions 32 and 34.

When it is desired to move the valve member 138 to the valve-open position, a flare nut (not shown) is threaded on the portion 56. Similarly to the valve 10, the flare nut engages and moves the valve member 138 rearwardly thereby spacing the O-ring from the wall 136. Hence, the O-ring will no longer seal the passage between the bore portions 32 and 34 and the fluid will flow easily through the valve.

A radial passage 162 is provided in the valve body 114 which extends from the bore 128 to one of the faces of the flange 60. A fusible plug 164 completely fills the passage 162. The plug 164 is adapted to melt at a preselected temperature to provide a path from the bore 128 to the exterior of the valve albeit the valve member 138 is in the valve-closed position. Hence, if the temperature of the fluid controlled by the valve section 114 increases to the preselected temperature, the plug 164 melts to provide an outlet for the fluid. Thus, the plug 164 provides safety means for preventing overheating of the stored fluid.

It should be noted that the fusible plug also may be provided in the valve section. section 14.

Accordingly, the valve section 114 may be quickly and easily fabricated and assembled to provide a highly reliable valve.

While preferred embodiments of the invention have been shown and described herein, it will be obvious that numerous omissions, changes and additions may be made in such embodiments without departing from the spirit and scope of the present invention.

I claim:

1. A valve for controlling the flow of a fluid comprising a valve body having a through bore; said through bore having a first enlarged diameter portion and a second reduced diameter portion interconnected by a connecting wall; a valve member slidingly received in said bore; said valve member comprising a circular portion received in said first portion of said first bore having a diameter which is less than the diameter of said first portion to define a fluid passage therebetween, a forwardly extending portion received in said second portion of said bore having spaced radially extending arms in sliding engagement with said second portion whereby the space between adjacent arms define respective passages for the flow of the fluid, and sealing means for sealingly engaging said connecting wall to prevent the flow of the fluid through said bore; and biasing means for biasing said valve member into engagement with said connecting walls, said biasing means comprising a spring received in said first portion of said bore having one end beating against said valve member, and a washer frictionally retained in said first portion of said bore abutting the other end of said spring to maintain said spring in position; said washer being fabricated from a flexible material, and comprising a plurality of circumferentially spaced teeth, said washer having a diameter slightly in excess of the diameter of said first portion of said bore, whereby the edges of said plurality of teeth contact the walls defining said first portion of said bore in tight frictional engagement; said valve body being provided with an externally threaded portion adapted to receive a flare nut, said arms being sized to extend beyond said valve body when said sealing means sealingly engages said connecting wall, whereby a flare nut engages said valve member and moves said sealing means out of engagement with said connecting wall when the flare nut is threaded onto said valve body; said valve body including a connecting member and a valve section having said valve member therein, said connecting member including a first externally threaded portion adapted to be threaded into a tank, a second externally threaded portion on said connecting member and a radially extending flange between said first and second portion, and an internally threaded portion in said valve section threadedly receiving said second portion of said connecting member.

2. A valve as in claim 1, in which said sealing means comprises an O-ring fabricated from a flexible and resilient material on said valve member, said O-ring being sized and positioned to sealingly engage said connecting wall to prevent the flow of a fluid therebetween.

3. A valve as in claim 1, in which said connecting wall includes an inclined wall, and said sealing means includes a portion on said valve member formed complementary to said inclined wall.

UNITED STATES PATENT OFFICE
CERTIFICATE OF CORRECTION

Patent No. 3,556,470            Dated    January 19, 1971

Inventor(s)   Henry Ehrens et al.

It is certified that error appears in the above-identified patent and that said Letters Patent are hereby corrected as shown below:

Column 4, line 66, "beating" should read -- bearing --.

Signed and sealed this 17th day of August 1971.

(SEAL)
Attest:

EDWARD M. FLETCHER, JR.            WILLIAM E. SCHUYLER, J
Attesting Officer                    Commissioner of Patent

FORM PO-1050 (10-69)